(12) United States Patent
Leonard

(10) Patent No.: US 7,305,008 B2
(45) Date of Patent: Dec. 4, 2007

(54) PARALLEL BUS LAN

(75) Inventor: Martin Eugene Leonard, Hollister, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1247 days.

(21) Appl. No.: 09/809,761

(22) Filed: Mar. 14, 2001

(65) Prior Publication Data

US 2003/0035435 A1 Feb. 20, 2003

(51) Int. Cl.
*H04J 3/16* (2006.01)
*H04L 12/28* (2006.01)

(52) U.S. Cl. ............... 370/468; 370/365; 370/412

(58) Field of Classification Search ............. 370/360, 370/362, 363, 364, 365, 366, 367, 368, 412, 370/413, 438, 439, 447, 461, 462, 463, 468
See application file for complete search history.

(56) References Cited

U.S. PATENT DOCUMENTS

| | | | |
|---|---|---|---|
| 4,373,183 A * | 2/1983 | Means et al. ............... 710/124 |
| 4,375,639 A | 3/1983 | Johnson, Jr. |
| 4,470,112 A | 9/1984 | Dimmick |
| 4,488,218 A | 12/1984 | Grimes |
| 4,608,700 A * | 8/1986 | Kirtley et al. .............. 370/439 |
| 4,631,534 A | 12/1986 | Franklin et al. |
| 4,642,630 A * | 2/1987 | Beckner et al. ........... 340/825.5 |
| 4,656,627 A | 4/1987 | Hasley et al. |
| 5,058,051 A | 10/1991 | Brooks |
| 5,659,718 A * | 8/1997 | Osman et al. ............... 713/400 |
| 6,002,675 A | 12/1999 | Ben-Michael et al. |
| 6,256,320 B1 * | 7/2001 | Tang et al. ................... 370/462 |
| 6,298,067 B1 * | 10/2001 | Tang .......................... 370/462 |
| 6,629,178 B1 | 9/2003 | Smith |
| 6,654,838 B1 | 11/2003 | Leonard |
| 6,701,399 B1 | 3/2004 | Brown |
| 6,760,799 B1 * | 7/2004 | Dunlap et al. .............. 710/260 |
| 6,782,457 B2 | 8/2004 | Hill et al. |

* cited by examiner

*Primary Examiner*—Afsar Qureshi

(57) ABSTRACT

A Local Area Network based on a parallel bus architecture is disclosed. The LAN provides a means of utilizing relatively low cost CMOS circuitry to obtain performance superior to LAN's utilizing more exotic high speed technology. The disclosed LAN is based on a parallel bus having n×8 data lines, ± power lines, and a clock line. The bandwidth of the LAN is the product of the number of data lines times the clock speed. Bandwidth is therefore scalable by increasing either the clock speed, the number of data lines, or both. Access to the bus is provided via ports which include transceivers, a clock receiver, and a configurable hardware interface. Each port is assigned an address based on a data line and a clock cycle. The invention features a network that becomes more efficient as usage increases, ports that can accept any medium, and an architecture that facilitates implementation of a true "STAR" LAN configuration which interfaces between two or more serial communications links.

14 Claims, 2 Drawing Sheets

PARALLEL BUS LAN

BACKGROUND OF THE INVENTION

1. Field of the Invention

The invention relates to a local area network (LAN). More particularly, the invention relates to a scalable, high performance LAN formed from a parallel bus that has an extended bandwidth advantage permitting utilization of up to 99% of the bandwidth.

2. Brief Description of the Prior Art

Current LAN's are primarily of two types: "token ring" and Ethernet™. Both token ring and Ethernet require specific hardware to be installed into the terminal stations (PC's, Printers, etc.) in order to access the network. The networks are connected as logical rings or a single bus and follow a serial data protocol throughout the network. The presently preferred and most popular network is the Ethernet network.

Ethernet is basically a serial link protocol. It can be implemented in twisted pair wiring, coaxial cable, or glass fiber (FDDI). All cabling must be terminated at each end with an Ethernet transceiver adapter. It operates using broadcast technology, whereby each station transmits in a serial manner and is received simultaneously by all other stations on the immediate network. The transceivers implement carrier-sense multiple access with collision detection (CSMA/CD) technology. Ethernet frames are between 46 and 1500 bytes. Physical connection of Ethernet stations can be from Station to Station, or the network can be connected via a central hub. The stations can detect when the carrier is being used and back off to avoid collision. When a collision is detected by a transceiver, it invokes a back-off algorithm, which causes the transceiver to wait a random period of time before attempting another broadcast on the network.

Although it is virtually the industry standard, Ethernet has several disadvantages:

Studies have shown that during periods of heavy traffic, utilization of the Ethernet can fall to 40% or less of the available bandwidth.

Ethernet requires compatibility of all stations in both hardware and protocol in order for the stations to access the network. For PC's this means an Ethernet compatible NIC (Network Interface Card).

Ethernet requires a dedicated medium (coax, twisted pair, etc.) in order for a station to access the network.

Ethernet hubs are limited in the number of ports that they can accept. Expansion means replacing the hub with a hub of larger capacity or adding another hub, either of which may result in unused capacity.

Bandwidth is limited to the discrete values established by the industry (e.g. 10k, 100k, and 1,000k). To achieve higher bandwidth more and more exotic and expensive technology will be required.

SUMMARY OF THE INVENTION

It is therefore an object of the invention to provide a local area network.

It is also an object of the invention to provide a local area network which is efficient even under heavy usage.

It is another object of the invention to provide a local area network which is adaptable to different hardware interfaces.

It is yet another object of the invention to provide local area network which does not require a dedicated medium for each station coupled to the network.

It is another object of the invention to provide a local area network which is readily expandable to accommodate more users.

It is still another object of the invention to provide a local area network which has a broadly selectable bandwidth.

In accord with these objects which will be discussed in detail below, the local area network according to the invention is based on a parallel bus having n×8 data lines, ± power lines, and a clock line. The bandwidth of the LAN is the product of the number of data lines times the clock speed. Bandwidth is therefore scalable by increasing either the clock speed, the number of data lines, or both. Access to the bus is provided via ports which include transceivers, a clock receiver, and a configurable hardware interface.

According to the presently preferred embodiment of a port, one transceiver is provided for each data line and two FIFO buffers are provided in each port, one buffer for transmitting and one for receiving. According to the presently preferred embodiment, eight data lines are provided and each FIFO buffer is 2 kilobytes deep.

Access to the bus is provided in a repeating variable length frame, a portion of which is dedicated to bidding for access to the bus. Each port is assigned an address based on a data line and a clock cycle. Bidding takes place during the first p clock cycles of the frame, where p is the number of data ports divided by the number of data lines, rounded to the next highest integer. For example, for 20 ports and 8 data lines, p=20/8=2.5, rounded to 3. Following bidding, the bidders' addresses are placed in a queue in order of priority of ports.

Before data is transmitted, the message length is transmitted during clock cycle p+1 and the destination address is transmitted during clock cycle p+2. The destination port may refuse the transmission during clock cycle p+3. If the transmission is not refused, data is transmitted during clock cycles p+4 through p+4+n/b where n is less than or equal to the size of the buffers in bytes and b is the byte width of the data bus. Buffer bytes are written during a final timeslot p+4+n/b+1 where the message length is not evenly divisible by the byte width of the data bus.

The network of the invention becomes more efficient as usage increases. Because the queuing system employed is offline, ports govern themselves in respect to bus access and there is no unseemly crowding for control when a port has relinquished use of the bus. Bidding is done in a calm and dignified manner, with the port having the highest priority allowed to use the bus whenever two or more ports bid for access.

External stations can be of any nature. The interface ports that are plugged into the LAN will each be unique to the station to which it is linked. This means there can be ports that accept 19.6 Kbaud serial links and ports that accept 100 Mbaud Ethernet links. Since a 10 Megahertz 16 bit bus has a bandwidth of 160 megabaud, such an implementation can easily accept 100 Mbaud Ethernet ports.

The ports of the parallel bus LAN can accept any medium. Any electronic data that can be converted into digital form can be passed over the LAN. It is only necessary to design an interface port to do the conversion. This means, among other things, that networks can be developed that use ADSL technology to implement high speed data connectivity across the existing telephone infrastructure with no impact on the voice switching network.

The parallel bus LAN can be designed as a relatively inexpensive backbone capable of accepting a large number of ports. The flexibility of the design leads to almost limitless numbers of configurations involving bus frequency, bus width, port types, etc. Bandwidth is virtually unlimited. The parallel bus LAN can be expanded to any practical width and any practical frequency.

For example, a bus that is 64 bits wide running at a clock speed of 100 MHz, has a bandwidth of 6.4 Gigabaud. This is easily achievable with existing technology. The individual stations continue to operate at whatever baud rate their existing ports are capable of. But with the parallel bus LAN, the network bandwidth can be so increased that delays due to heavy usage will virtually disappear.

DETAILED DESCRIPTION

Figure 1:
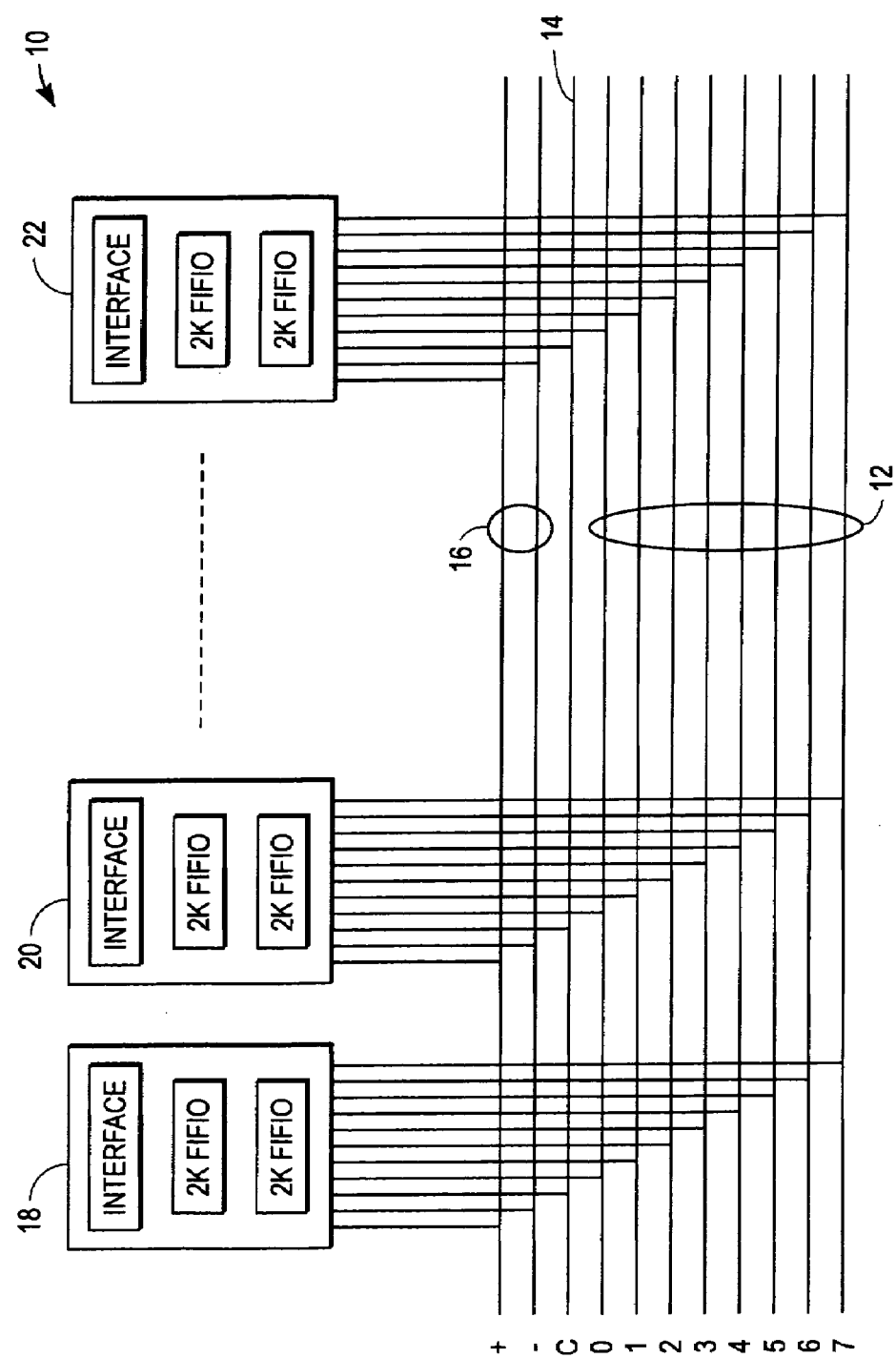
FIG. 1 is a high level schematic diagram of a parallel bus LAN according to the invention.

Turning now to FIG. 1, a parallel bus LAN 10 according to the invention includes a data bus 12, a clock bus 14, a power bus 16 and a plurality of users or "ports" 18, 20, 22. According to the invention, the data bus 12 has n*8 data lines and each port includes a transceiver for each data line.

According to the presently preferred embodiment, each port includes two FIFO buffers (preferably 2KB each), one for incoming data and one for outgoing data, and a hardware interface. According to a preferred aspect of the invention, each port has a hardware interface which is adapted specifically for a particular piece of hardware. For example, the hardware interface may be a serial port link, an Ethernet port link, a USB port link, a FireWire™ port link, etc.

Figure 2:
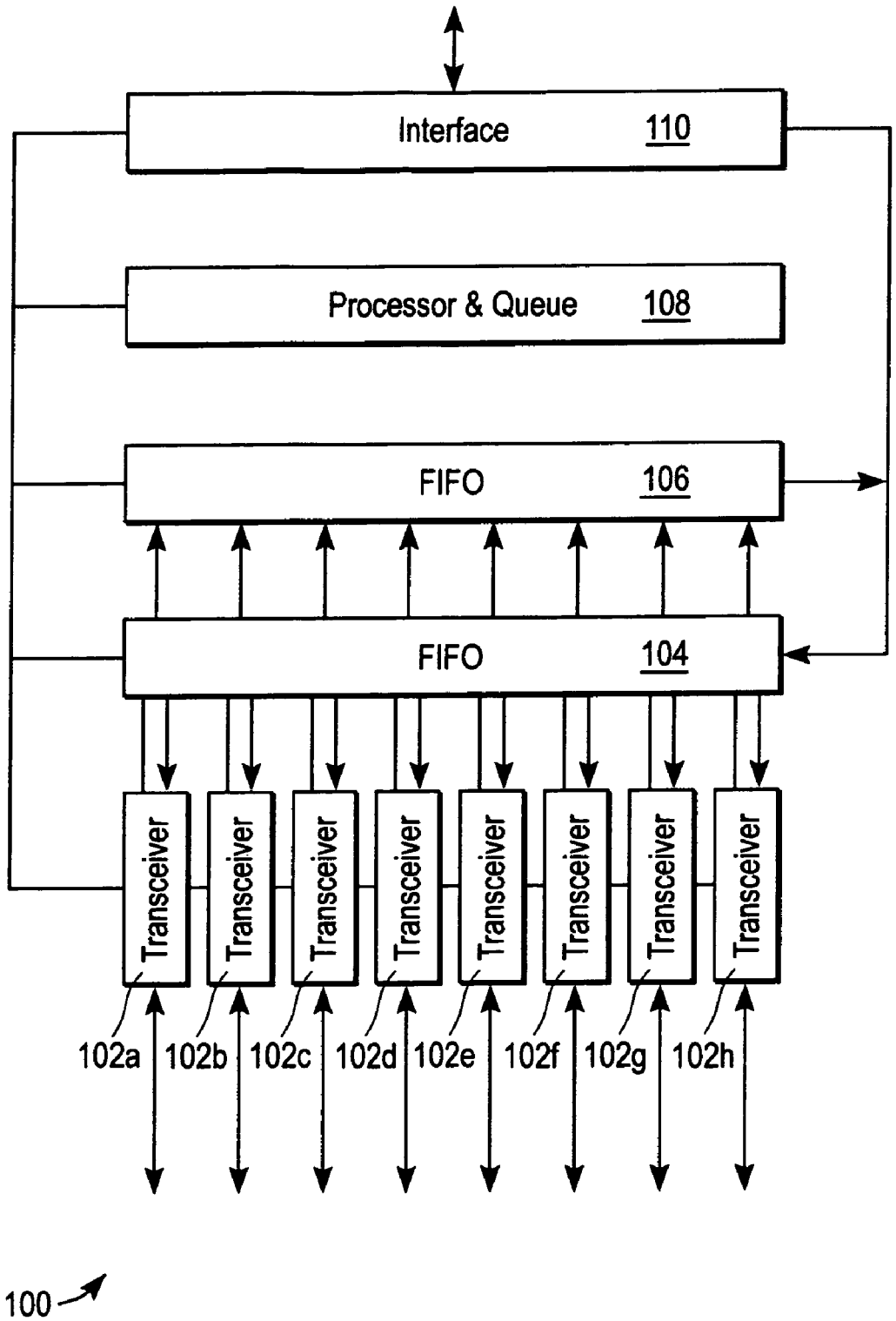
FIG. 2 is a high level schematic diagram of a bus port according to the invention.

Referring now to FIG. 2, an exemplary embodiment of a port 100 according to the invention includes a plurality of transceivers 102a–102h, one for each bit of the data bus, an output FIFO 104, an input FIFO 106, a processor with output queue 108 and a hardware interface 110. As shown in FIG. 2, the processor is coupled to all of the other components so as to control the flow of data to and from the bus. The interface 110 supplies data to the output FIFO 104 and receives data from the input FIFO 106. Both FIFOs are coupled to the transceivers which are coupled to the bus.

According to the invention, data is placed on the bus in a repeating, variable length, frame having the format shown in Table 1.

TABLE 1

| Clock cycle | Data Bus Content |
| --- | --- |
| 1 | Bit mapped bids |
| ⁂ | Bit mapped bids |
| P | Bit mapped bids |
| P + 1 | Message length |
| P + 2 | Destination Address |
| P + 3 | Port busy |
| P + 4 | Data |
| ⁂ | Data |
| P + 4 + n/b | Data |
| P + 4 + n/b + 1 | Data + Buffer bits |

Each port is assigned an address based on a data line and a clock cycle as described in more detail below with reference to Table 2. Bidding takes place during the first p clock cycles of the frame, where p is the number of data ports divided by the number of data lines, rounded to the next highest integer. For example, for 20 ports and 8 data lines, $p=20/8=2.5$, rounded to 3. Following bidding, the bidders' addresses are placed in a queue in order of priority of ports. All ports monitor the bus. Each port maintains a copy of the queue and writes to the bus in turn based on the queue. The queue contains the addresses of the ports that have unsuccessfully bid for the bus and are waiting for an opportunity to send a message. Ports are allowed to take possession of the bus in the order in which they placed their bids. When glare occurs (two ports bid at the same time), the lower number address(higher priority) port receives the earlier position in the queue.

Before data is transmitted, the message length is transmitted during clock cycle p+1 and the destination address is transmitted during clock cycle p+2. The destination port may refuse the transmission during clock cycle p+3. The transmitting port turns off its transmitters during the BUSY timeslot (p+3) to permit the destination port a chance to refuse the message.

An address value is the decimal value assigned to the destination port. Ports read this address during the p+2 clock cycle and accept data from the bus when the address is their own. If a port's buffer space is not sufficient for the message length, it will place a 0 on all the bits of the bus at the time of the BUSY timeslot in order to refuse the incoming message. In this case, the transmitting station truncates the message, places an EOM code on the bus and bids again. The port wishing to transmit continues to attempt to transmit (via bidding and transmission) until the receiving station is able to accept the message.

If the transmission is not refused, data is transmitted during clock cycles p+4 through p+4+n/b where n is less than or equal to the size of the buffers in bytes and b is the byte width of the data bus. Buffer bytes are written during a final timeslot p+4+n/b+1 where the message length is not evenly divisible by the byte width of the data bus. If the queue is not empty at the end of a message, the bidding process is skipped and the next port in the queue takes possession of the bus following the buffer byte(s).

Bidding is the process whereby a port expresses its intention of taking possession of the data bus for the purpose of transmitting a message to one or more other ports. A port wishing to send a message, places a 0 voltage on the bus on ALL bit positions for one timeslot to signal the beginning of a frame. Then it places a 0 voltage on the line corresponding to its bit position at the time of its byte position. If, for example an 8 bit bus LAN is designed for 64 ports, the first 8 bytes of a frame are dedicated to the bidding effort. Together, these bytes compose a bid chart. Each bit of a byte represents a particular port, determined by the value of that port's pre-assigned port number (from 1 to 64) as shown in Table 2. The formula to determine a port's bit position is (port number/ 8)=byte number and the remainder=bit number. If the bus width is some multiple of eight, the formula doesn't change, although the timeslot location of the bit may change.

TABLE 2

| | Bit 7 | Bit 6 | Bit 5 | Bit 4 | Bit 3 | Bit 2 | Bit 1 | Bit 0 |
| --- | --- | --- | --- | --- | --- | --- | --- | --- |
| Byte 0 | Port 7 | Port 6 | Port 5 | Port 4 | Port 3 | Port 2 | Port 1 | Port 0 |
| Byte 1 | Port 15 | Port 14 | Port 13 | Port 12 | Port 11 | Port 10 | Port 9 | Port 8 |
| Byte 2 | Port 23 | Port 22 | Port 21 | Port 20 | Port 19 | Port 18 | Port 17 | Port 16 |
| Byte 3 | Port 31 | Port 30 | Port 29 | Port 28 | Port 27 | Port 26 | Port 25 | Pod 24 |

TABLE 2-continued

|  | Bit 7 | Bit 6 | Bit 5 | Bit 4 | Bit 3 | Bit 2 | Bit 1 | Bit 0 |
|---|---|---|---|---|---|---|---|---|
| Byte 4 | Port 39 | Port 38 | Port 37 | Port 36 | Port 35 | Port 34 | Port 33 | Port 32 |
| Byte 5 | Port 47 | Port 46 | Port 45 | Port 44 | Port 43 | Port 42 | Port 41 | Port 40 |
| Byte 6 | Port 55 | Port 54 | Port 53 | Port 52 | Port 51 | Port 50 | Port 49 | Port 48 |
| Byte 7 | Port 63 | Port 62 | Port 61 | Port 60 | Port 59 | Port 58 | Port 57 | Port 56 |

The parallel bus LAN according to the invention allows the implementation of a true "star" LAN configuration which interfaces between two or more serial communication links. It provides a medium for serial links of disparate hardware types running at disparate speeds to exchange digital information without loss of data integrity and without suffering significant delays. In conjunction with the logical architecture described above, the LAN provides a physical interconnecting hub of scaleable bandwidth and minimal overhead with the versatility to meet almost any networking situation.

The parallel bus LAN of the invention permits use of existing wiring infrastructure in a high speed data network, especially for, but not limited to, the telephony network. It provides highly efficient use of the network bandwidth and an elegant solution to heavy traffic situations. There is no possibility of any particular port losing out in contention arbitration. The LAN has the versatility to be implemented in very inexpensive hardware in applications where current technology would be prohibitively expensive or in state of the art technology to give performance untouched by any existing LAN.

There have been described and illustrated herein a parallel bus LAN and an arbitration protocol for use therewith. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A local area network, comprising:
   a) a data bus having a multiple of eight parallel data lines;
   b) a clock bus;
   c) a plurality of bus ports coupled to said data bus and said clock bus, each bus part including a transceiver coupled to each of said data lines, an input buffer coupled to said transceivers, an output buffer coupled to said transceivers, and a hardware interface coupled to said buffers, wherein at least two bus ports have different hardware interfaces and wherein data is transferred on the data bus in a repeating, variable length frame, said frame being defined by a plurality of clock cycles, at least one of which is reserved for bidding for access to transmit on the data bus, following the bidding cycle, at least one cycle is reserved for transmission of message length, at least one cycle is reserved for transmission of destination address, and at least one cycle is reserved for the port having the destination address to assert a busy signal on the data bus.

2. A local area network according to claim 1, further comprising a power bus, each of said bus ports being coupled to said power bus and drawing power therefrom.

3. A local area network according to claim 1, wherein said hardware interfaces are selected from the group consisting of a serial port link, an Ethernet port link, a USB port link, and a FireWire™ port link.

4. A local area network according to claim 1, wherein said input and output buffers are each two kilobyte FIFOs.

5. A local area network according to claim 1, wherein each of said ports has a unique address defining a unique priority value.

6. A local area network according to claim 5, wherein following the bidding cycle, access to the bus is granted to the port having the highest priority and the other bidding port addresses are placed in a queue in order of priority.

7. A local area network according to claim 6, wherein each port maintains a copy of the queue.

8. A parallel bus local area network, including a plurality of ports with each port having a unique address assigned thereto defining a unique priority value, wherein at least two ports have different hardware interfaces, comprising:
   a) means for generating a repeating, variable length frame;
   b) port control means for bidding for access to the bus during at least one predefined clock cycle of the frame; and
   c) a bus controller for granting access to the bidding port having the highest priority and placing the other bidding port addresses in a queue; wherein at least one cycle of the frame is reserved for transmission of message length, at least one cycle is reserved for transmission of destination address, and at least one cycle is reserved for the port having the destination address to assert a busy signal on the data bus.

9. Apparatus according to claim 8 wherein each port maintains a copy of the queue.

10. Apparatus according to claim 8 wherein bidding is only permitted when the queue is empty.

11. Apparatus according to claim 8 further comprising:
   d) means for enabling the port having access to the data bus to transmit a message length during the message length cycle of the frame; and
   e) means for enabling the port having access to the data bus to transmit a destination address during the destination address cycle of the frame.

12. Apparatus according to claim 11, further comprising:
   f) means for enabling the port having the destination address to assert the busy signal during the busy cycle of the frame; and
   g) means for enabling the port attempting to transmit to the busy port to repeat bidding until the message is sent.

13. A local area network, comprising:
   a) a data bus having a plurality of parallel data lines; and
   b) a clock bus having a clock frequency; and
   c) a plurality of bus ports coupled to said data bus and said clock bus, wherein each of said bus ports has a configurable hardware interface and wherein data is transferred on the data bus in a repeating, variable length frame, said frame being defined by a plurality of clock cycles, at least one of which is reserved for bidding for access to transmit on the data bus, following the bidding cycle, at least one cycle is reserved for transmission of message length, at least one cycle is reserved for transmission of destination address, and at least one cycle is reserved for the port having the destination address to assert a busy signal on the data bus.

14. A local area network according to claim 13, wherein said configurable hardware interfaces are selected from the group consisting of a serial port link, an Ethernet port link, a USB port link, and a FireWire™ port link.

* * * * *